United States Patent
Cotton et al.

[19]

[11] Patent Number: 6,058,964
[45] Date of Patent: May 9, 2000

[54] MULTI-LEVEL FUEL PICKUP

[75] Inventors: Kenneth J. Cotton, Caro; Ronald H. Roche, Cass City, both of Mich.

[73] Assignee: Walbro Corporation, Cass City, Mich.

[21] Appl. No.: 08/990,932

[22] Filed: Dec. 15, 1997

[51] Int. Cl.$^7$ ............................ F16K 31/22; F16K 33/00; F02M 37/04
[52] U.S. Cl. ........................ 137/202; 123/509; 137/399; 137/433; 137/574; 137/590; 222/66; 222/67; 222/376
[58] Field of Search ..................................... 137/398, 433, 137/574, 590, 192, 202, 399; 123/509; 222/64, 66, 67, 321.4, 376

[56] References Cited

U.S. PATENT DOCUMENTS

| | | | |
|---|---|---|---|
| 1,072,371 | 9/1913 | Stone | 137/590 |
| 1,139,129 | 5/1915 | Lyons | 137/590 |
| 1,329,074 | 1/1920 | Fehan | 137/590 |
| 1,407,799 | 2/1922 | Muzzy | 137/590 |
| 1,435,653 | 11/1922 | Muzzy | 137/590 |
| 1,462,216 | 7/1923 | Stadler et al. | 137/590 |
| 1,462,217 | 7/1923 | Stadler et al. | 137/590 |
| 1,484,900 | 2/1924 | Muzzy | 137/590 |
| 1,523,320 | 1/1925 | Wall | 137/590 |
| 1,605,619 | 11/1926 | Schreiner | 137/590 |
| 1,714,250 | 5/1929 | Stahl | 137/590 |
| 1,792,827 | 2/1931 | Farkas | 137/590 |

*Primary Examiner*—George L. Walton
*Attorney, Agent, or Firm*—Reising, Ethington, Barnes, Kisselle, Learman & McCulloch, P.C.

[57] ABSTRACT

A multi-level fuel pickup system has a float valve in communication with a first fuel passage having an open end disposed at a first height within the fuel tank spaced from the bottom of the fuel tank to prevent fluid flow through the first fuel passage when liquid fuel is absent adjacent its open end. A second fuel passage communicates adjacent the bottom of the fuel tank and below the first height and fuel is drawn through this fuel passage when a low level of fuel remains in the fuel tank. A fuel control valve is manually adjustable to control through which of the fuel passages fuel is drawn. Preferably, each of the fuel passages is at least partially formed in a valve body mounted within the fuel tank and the float valve comprises a spherical float received in a bore in the valve body and is responsive to the level of fuel within the bore.

16 Claims, 3 Drawing Sheets

MULTI-LEVEL FUEL PICKUP

FIELD OF THE INVENTION

This invention relates to a fuel delivery system and more particularly to a multi-level fuel pickup through which fuel is drawn from a fuel tank of the fuel system.

BACKGROUND OF THE INVENTION

In certain vehicles, such as motorcycles, all terrain vehicles and personal water craft, a fuel valve is provided which has both an "on" and a "reserve" position to control the transfer of fuel from the fuel tank to the engine. In the on position the top 80 to 90% of the fuel tank volume is available to be drawn to the engine and when the fuel tank is below that level no more fuel is delivered to the engine and the engine stalls out. The operator then has to switch the fuel valve to the reserve position wherein the fuel adjacent the bottom of the tank is made available to the engine. Forcing the operator to manually adjust the fuel valve from the on position to the reserve position, alerts the operator that the vehicle is low on fuel so that the operator can return the vehicle to be refueled. This is desirable, for example, in a personal water craft application to protect operators of those vehicles from completely running out of fuel when they are a long distance from the shore.

Current systems utilize two drop tubes of different lengths extended through the top wall of the fuel tank, or two stand tubes of different lengths extended through the bottom wall of the fuel tank, and communicating at different levels within the fuel tank. When the fuel valve is in the on position, fuel is drawn through the shorter of the two tubes when received through the top wall of the fuel tank and when fuel is absent from the open end of that tube, the vehicle stalls out. However, due to fuel sloshing within the fuel tank during normal operation of the vehicle such as turning, accelerating, stopping or when operating over rough terrain or rough water, a significant amount of air may be passed through the tube and drawn into the engine. Especially in a two stroke engine, extended periods of operation with air ingestion will cause engine damage and even engine failure. Thus, there is a need to limit the air ingestion while still providing the multi-level fuel pickup with a fuel valve manually operable between on and reserve positions.

SUMMARY OF THE INVENTION

A multilevel fuel pickup system has a float valve in communication with a first fuel passage having an open end disposed at a first height within the fuel tank spaced from the bottom of the fuel tank to prevent fluid flow through the first fuel passage when liquid fuel is absent adjacent its open end. A second fuel passage communicates adjacent the bottom of the fuel tank and fuel is drawn through this fuel passage when a low level of fuel remains in the fuel tank. A fuel control valve is manually adjustable to control through which of the fuel passages fuel is drawn. Preferably, each of the fuel passages is at least partially formed in a valve body mounted within the fuel tank and the float valve comprises a spherical float or other buoyant float received in a bore in the valve body and is responsive to the level of fuel within the bore.

During normal operating conditions, the fuel valve is in its first, or "ON", position and fuel is drawn through the first fuel passage. When the level of fuel in the fuel tank is below the open end of the first fuel passage the float closes the first fuel passage to prevent fluid flow therethrough. This prevents excessive air from being drawn into the operating engine to prevent damage to the engine. To draw the remaining fuel from the fuel tank, the operator of the vehicle must manually switch the fuel valve to its second, or "RESERVE", position thereby opening the second fuel passage to draw fuel therethrough. This alerts the operator of the vehicle that the vehicle is running low on fuel and that additional fuel should be added to the fuel tank.

Objects, features and advantages of this invention include providing a multi-level fuel pickup which reduces the amount of air drawn into the operating engine, provides a clear warning to the operator of the vehicle when the vehicle is running low on fuel, is effective even when the fuel is sloshing within the fuel tank, increases the life of the engine, increases the performance of the engine, is of relatively simple design, economical manufacture and assembly, reliable and durable and in service, has a long useful life.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1:
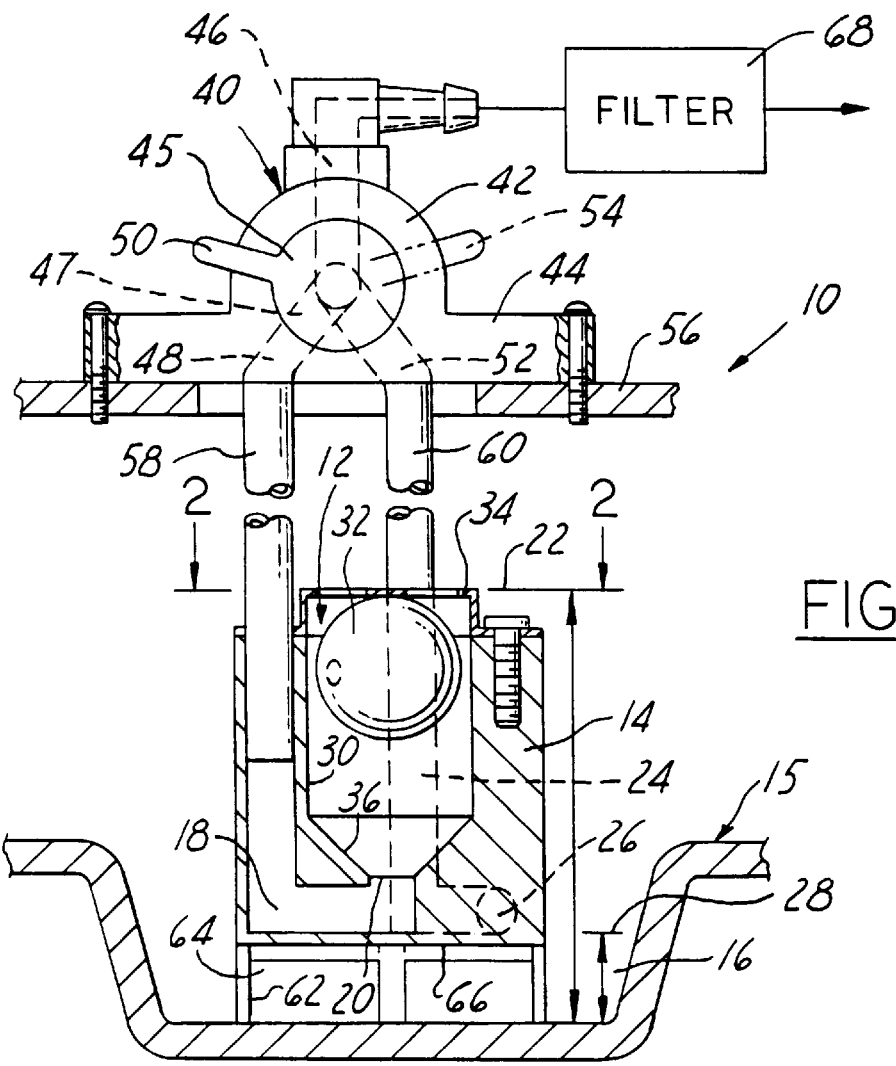
FIG. 1 is a broken sectional view of a fuel pickup system embodying this invention mounted in a fuel tank.
Figure 2:
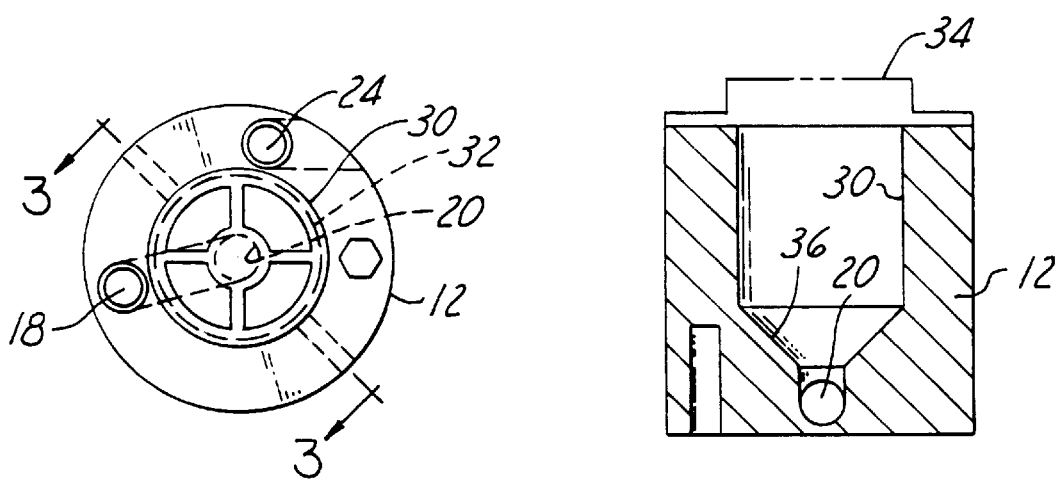
FIG. 2 is a sectional view taken along line 2—2 of FIG. 1 of the valve body received within the fuel tank.
Figure 3:
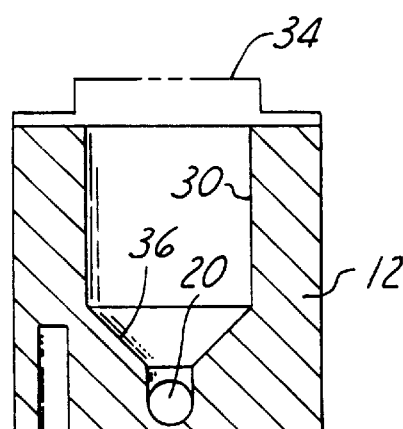
FIG. 3 is a sectional view taken along line 3—3 of FIG. 2.

Referring in more detail to the drawings, FIG. 1 shows a multi-level fuel pickup system 10 for delivering fuel to an operating engine. The system 10 has a valve assembly 12 in a body 14 disposed within the vehicle fuel tank 15 generally adjacent the bottom or a sump 16 of the fuel tank 15 with a first fuel passage 18 at least partially formed therein having an inlet 20 and communicating with the fuel tank 15 through the valve assembly 12 at a first level 22 in the fuel tank 15 spaced from the bottom of the fuel tank 15. A second fuel passage 24 is at least partially formed in the body 14 and has an inlet 26 disposed at a second level 28 in the fuel tank below the first level 22 and generally adjacent the bottom of the fuel tank 15.

A cylindrical valve bore 30 is formed in the body 14 and is constructed to receive a spherical float valve closure 32 which is made of a material having a specific gravity less than that of the fuel within the fuel tank so that it is buoyant in the fuel and is responsive to the fuel level within the valve bore 30. A perforate cap 34 or filter received over the valve bore 30 retains the float valve 32 within the valve bore 30 and permits fuel to enter the bore. The other end of the valve bore 30 is generally frustum shaped and provides an annular valve seat 36 on which the closure 32 bears to close the valve 12 when the fuel level within the valve bore 30 is sufficiently low to prevent further fluid flow through the first fuel passage 18.

A fuel control valve 40 has a housing 42 with a radial flange 44 mounted to the exterior of the fuel tank 15. A rotary valve 45 in the housing selectively communicates an outlet 46 connected to the fuel system downstream of the control valve with either the first fuel passage 18 or the second fuel passage 24. The rotary valve has a passage 47 therein which communicates the outlet with a first fuel inlet 48 when the fuel valve is in its first position 50 and communicates the outlet with a second inlet 52 when the fuel valve is in its second position 54. The inlets 52 and 54 are connected by fluid conduits or tubes 58 and 60 to the first fuel passage 18 and the second fuel passage 24.

The body 12 preferably has standoff feet 62 which engage the bottom or lowest portion of the fuel tank 15 and provide a gap 64 between the valve body 12 and the fuel tank 15 through which fuel may flow into the second fuel passage 24. Preferably, a circular layer of filter material 66 is disposed on the bottom of the valve body 12 to filter the fuel drawn into the second fuel passage 24. Preferably, a fuel filter 68 is also disposed downstream of the fuel control valve 40 exteriorly of the fuel tank 15 to filter all of the fuel drawn from the fuel tank 15.

In use, the fuel control valve 40 is normally in its first position 50 wherein its outlet 46 communicates with the tank through the first fuel passage 18. When the level of fuel in the tank is above the first level 22 the buoyant ball 32 floats in fuel in the bore 30 and the valve assembly is open to supply fuel through the passage 18, tube 58 and valve 40 to the engine. If there is only a momentary interruption of fuel supplied to the valve bore 30, such as when fuel sloshes in a fuel tank, the bore 30 provides a small quantity of fuel for use during such momentary interruption so that the engine operates normally and does not ingest air or fuel vapor. When the level of fuel in the fuel tank 15 falls below the first level 22 and is thus, below the openings in the perforate cap 34 additional fuel is not added to the valve bore 30, the remaining fuel in the valve bore 30 is drawn through the first fuel passage 18 and delivered to the engine and the float closure 32 is lowered, corresponding to the fuel level in the valve bore 30, and engages the valve seat 36 to close the valve assembly 12 and prevent fluid flow through the first fuel passage 18 so that the engine will run out of fuel, and stall. This closure of valve 12 prevents air from being ingested by the operating engine.

To deliver the fuel remaining in the fuel tank 15 to the engine, the operator of the vehicle must manually shift the fuel control valve 40 from its first position 50 to its second position 54. This closes the first inlet 48 and opens the second inlet 52 to communicate through the tube 60, passage 24 and inlet 26 with the fuel adjacent the bottom of the fuel tank 15 to supply it to the engine. Substantially all of the fuel within the tank 15 may be drawn through the second fuel passage 24 and delivered to the engine, until fuel is absent from the filter 66 adjacent the second fuel passage 24.

FIGS. 4–8 illustrate a second embodiment of a multi-level fuel pickup system 100 embodying the invention and having a valve assembly 102 in a body 104 disposed in the vehicle fuel tank 15 adjacent the bottom or a sump 16 of the fuel tank 15 as in the first embodiment. The body 104 has a cavity 106 formed therein and an integral upwardly extending hollow stem 108 which communicates with one end of a first fuel passage 110 which at its other end communicates with the first fuel inlet 48 of the valve assembly 40. A second fuel passage 112 communicates with the second fuel inlet 52 and extends into the fuel tank 15 separately from the first fuel passage 110 and body 104 and has its inlet 114 disposed adjacent the bottom of the tank 15. A cup-shaped enclosure 116 is press fit onto the body 104 over a sealing rib 117 and in cooperation with several stand-off feet 118 formed on the body 104 defines a closed chamber 120 communicating an opening 122 through the body 104 with the hollow stem 108 so that fuel within the cavity 106 is drawn into the first fuel passage 110 through the opening 122, the chamber 120 and the hollow stem 108. A connector 123 may be press fit into the hollow stem 108 with a portion extending out of the stem 108 to facilitate joining the first fuel passage 110 and the stem 108. Alternatively, the first fuel passage 110 may be press fit directly into the stem 108 or directly into an opening of an alternate valve body which does not have a stem. If desired, an annular filter 125 (shown in phantom in FIG. 4) may be provided across the cavity 106 slidably received with an interference fit over the tube 108 and 5 telescoped with an interference fit into the cup 116. If desired, a separate filter can also be applied to the bottom of tube 112 over its inlet 114.

Figure 4:
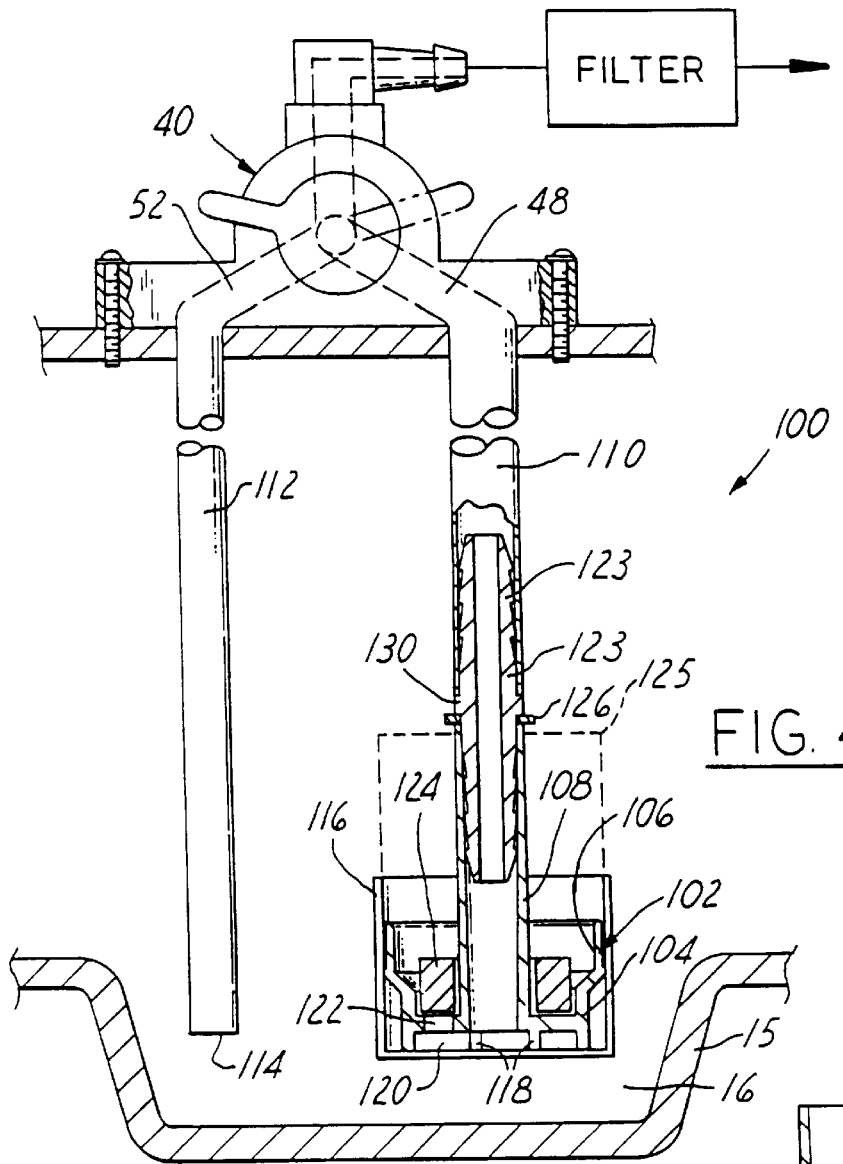
FIG. 4 is a broken sectional view of a second fuel pickup system embodying this invention.
Figure 8:
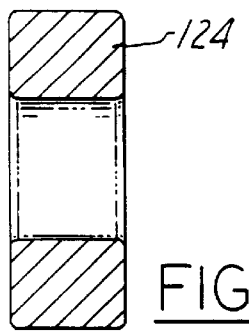
FIG. 8 is a cross sectional view of the float of the second embodiment.

As shown in FIGS. 4 and 8, the float valve closure 124 is annular, slidably received on the stem 108 (or directly on the first fuel passage 110 if the valve body 104 has no stem 108) and constructed and arranged to be slidably received within the cavity 106 and, when liquid fuel is absent from the cavity 106, to close the opening 122 to prevent air flow through the first fuel passage 110. As in the first embodiment, the float 124 is buoyant in liquid fuel so that when liquid fuel is present in the cavity 106 the float 124 is displaced from the opening 122 to permit unrestricted flow of fuel from the tank through the opening 122 and into the stem 108. An annular retainer 126 spaced from the opening 122 limits the travel of the float 124 away from the opening 122 and may be integrally formed on the stem 108 or the connector 123 or may be a separate piece such as a washer received between the stem 108 and the first fuel passage 110. A radially extending flange 130 of the connector 123 may be provided to trap the retainer 126 against the upper end of the stem 108.

Figure 5:
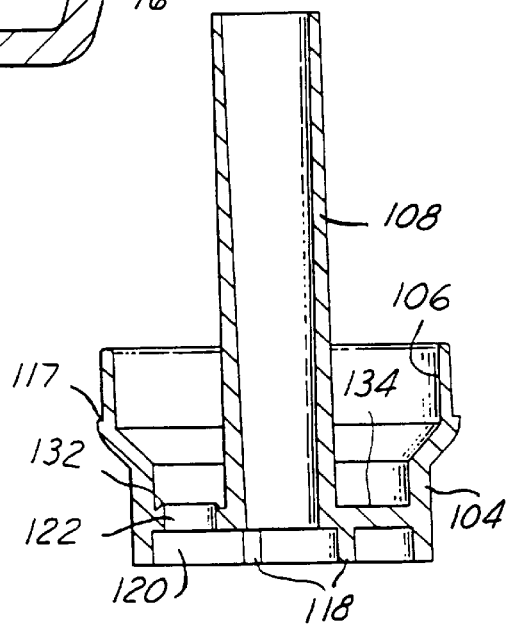
FIG. 5 is a cross sectional view of a valve body of the system of FIG. 4.

As shown in FIG. 5, an annular raised valve seat 132 is provided in the body 104 around the opening 122 for sealing by the float 124 when liquid fuel is absent from the cavity 106. This reduces the surface area of the body 104 contacted by the float 124 to facilitate removing the float 124 from the seat 132 when liquid fuel is again present within the cavity 106. The raised seat 132 also obviates the need for a flat lower face 134 of the cavity 106 which without the raised seat 132, would be needed to ensure that the float 124 would seal the opening 132 and which would increase the cost of manufacture of the body 104.

Figure 6:
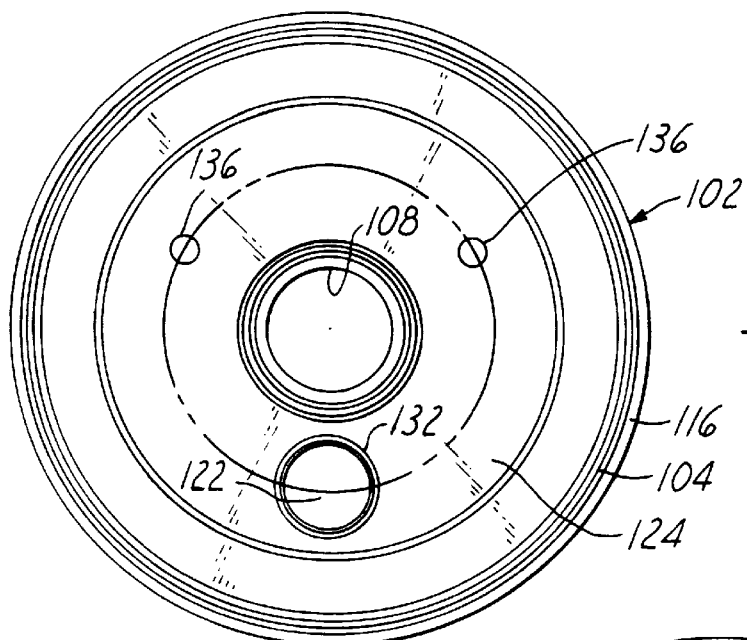
FIG. 6 is a top view of a valve body of FIG. 4.
Figure 7:
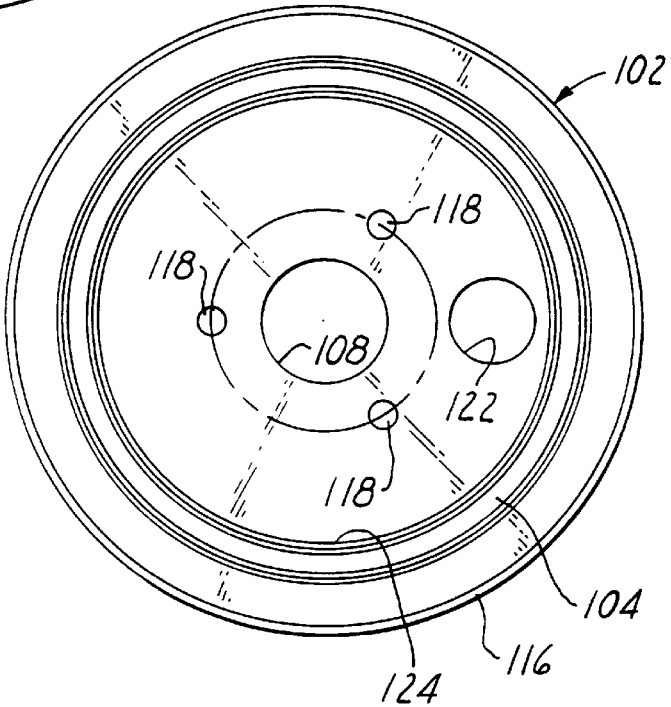
FIG. 7 is a bottom view of the valve body.

As shown in FIG. 6, upwardly extending projections or pins 136 formed on the lower face 134 of the cavity 106 may also be provided to limit the surface area of the body 104 contacted by the float 124 and preferably do not extend as high as the raised valve seat 132 so that they do not interfere with the engagement of the float 124 with and closure of the valve seat 132. These pins 136 space the float 124 from bottom wall 134 to prevent the float 124 from adhering to the bottom wall 134 during extended periods of non-use when there is a low fuel level in the tank 15 and the float 124 is adjacent the bottom wall 134 and to prevent a liquid seal between the float 124 and bottom wall 134 in use, and thereby reduce the magnitude of the buoyant force required to lift the float 124 from the seat to open the valve. Alternatively, the pins 136 may be the same height as or slightly higher than the valve seat 132 to provide a controlled leak through the opening 122. It is currently theorized that the opening 122 need not be completely closed but rather, when the float 124 severely restricts the flow through the opening 122, the engine will stall out as desired. This may be desirable because the controlled leak will reduce the pressure differential across the float 124 to facilitate removing the float 124 from the seat 132 when fuel is again present within the cavity 106 to permit fuel flow through the opening 122 and through the first fuel passage 110.

For similarly sized bodies 14 and 104, the annular float 124 is less likely to prematurely close due to sloshing fuel in the tank 15 than the spherical float valve closure 32 and the float 124 generally opens more quickly when acted on by liquid fuel and is less likely to stick in its closed position. The second embodiment multi-level fuel pickup system 100 functions in substantially the same manner as the first embodiment 10 and hence its operation will not be further described.

Thus, the multi-level fuel pickup systems 10 and 100 significantly reduce the amount of air drawn into an operating engine by utilizing the float valve assembly 12, 102 which is responsive to the fuel level adjacent to the inlet to the first fuel passage 18, 110. This system provides a clear warning to the operator of the vehicle that the vehicle is running low on fuel by requiring the operator to switch the fuel valve 40 from its first position 48 to its second position 50 and to restart the engine. The systems 10 and 100 are also highly effective even under adverse operating conditions which generate significant fuel slosh within the fuel tank 15. The systems 10 and 100 also permit substantially all of the fuel to be drawn from the fuel tank 15 and used by the engine while limiting the amount of air drawn into the engine to prevent damage to the engine.

What is claimed is:

1. A fuel pickup assembly through which fuel is drawn from a fuel tank comprising:
   a body in the tank and immediately adjacent the bottom of the tank;
   a cavity in the body, a fuel inlet to the cavity disposed at a first height spaced above the lowest portion of the fuel tank and in communication with the interior of the fuel tank;
   a first fuel passage having an inlet in the cavity and disposed at a second height spaced from and below the fuel inlet to the cavity to supply fuel to an operating engine;
   a separate second fuel passage having an inlet in communication with the interior of the fuel tank disposed at a third height below the fuel inlet to the cavity to supply remaining fuel in the fuel tank to the operating engine; and
   a valve connected to the first fuel passage and having a float in the cavity constructed to close the valve to automatically prevent gaseous fluid flow through the first fuel passage when liquid fuel is absent adjacent to the inlet to the first fuel passage.

2. The fuel pickup assembly of claim 1 wherein the valve comprises a valve seat adjacent the first fuel passage inlet and the float is made of a material buoyant in liquid fuel and engageable with the valve seat to substantially prevent fluid flow through the first fuel passage inlet.

3. The fuel pickup assembly of claim 2 in which the cavity comprises a bore passage in the body communication the first fuel passage inlet with the interior of the fuel tank and constructed to at least partially receive the float therein such that the float is responsive to the level of fuel in the bore passage.

4. The fuel pickup assembly of claim 3 which also comprises a retainer carried by the body, spaced from the first fuel passage inlet and constructed to contain the float between the retainer and first fuel passage inlet.

5. The fuel pickup assembly of claim 4 which also comprises one or more layers of a filter material overlying the float and carried by the body.

6. The fuel pickup assembly of claim 3 wherein the first fuel passage is at least partially formed in the body.

7. The fuel pickup assembly of claim 3 wherein the second fuel passage is at least partially formed in the body.

8. The fuel pickup assembly of claim 2 wherein the float is spherical and the valve seat is annular.

9. The fuel pickup assembly of claim 2 wherein the float is annular.

10. The fuel pickup assembly of claim 9 wherein the float is slidably received on the first fuel passage.

11. The fuel pickup assembly of claim 10 which also comprises a valve body in the cavity and communicating at one end with the interior of the fuel tank, a hollow stem extending from the valve body and communicating at one end with the first fuel passage, at least one opening communicating the cavity with the hollow stem with the valve seat disposed around the opening, and the float is slidably received on the stem and is engageable with the valve seat to restrict flow through the opening.

12. The fuel pickup assembly of claim 11 wherein the valve seat is a raised annular rim formed in the valve body.

13. The fuel pickup assembly of claim 11 wherein the body comprises a cup-shaped enclosure fitted on the valve body, defining a chamber communicating the opening with the stem, and permitting fuel in the fuel tank to enter the stem only through the opening.

14. The fuel pickup assembly of claim 11 which also comprises at least one raised projection disposed on the valve body and constructed to space the bottom of the float from the valve body when the float is on the valve seat.

15. The fuel pickup assembly of claim 1 which also comprises a fuel outlet from the tank, a fuel control valve in communication with the fuel outlet and both the first fuel passage and second fuel passage and moveable between first and second positions to prevent fuel from being drawn through the fuel outlet from the first fuel passage when in its second position and to prevent fuel from being drawn through the fuel outlet from the second fuel passage when in its first position.

16. The fuel pickup assembly of claim 15 wherein the control valve is manually operable.

* * * * *

UNITED STATES PATENT AND TRADEMARK OFFICE
CERTIFICATE OF CORRECTION

PATENT NO.    : 6,058,964                                    Page 1 of 1
DATED         : May 9, 2000
INVENTOR(S)   : Kenneth J. Cotton, Ronald H. Roche It is certified that error appears in the above-identified patent and that said Letters Patent is hereby corrected as shown below:

<u>Column 6,</u>
Line 2, change "communication" to -- communicating --.

Signed and Sealed this

Twenty-sixth Day of February, 2002

Attest:

JAMES E. ROGAN
Attesting Officer      Director of the United States Patent and Trademark Office